Patented Mar. 10, 1931

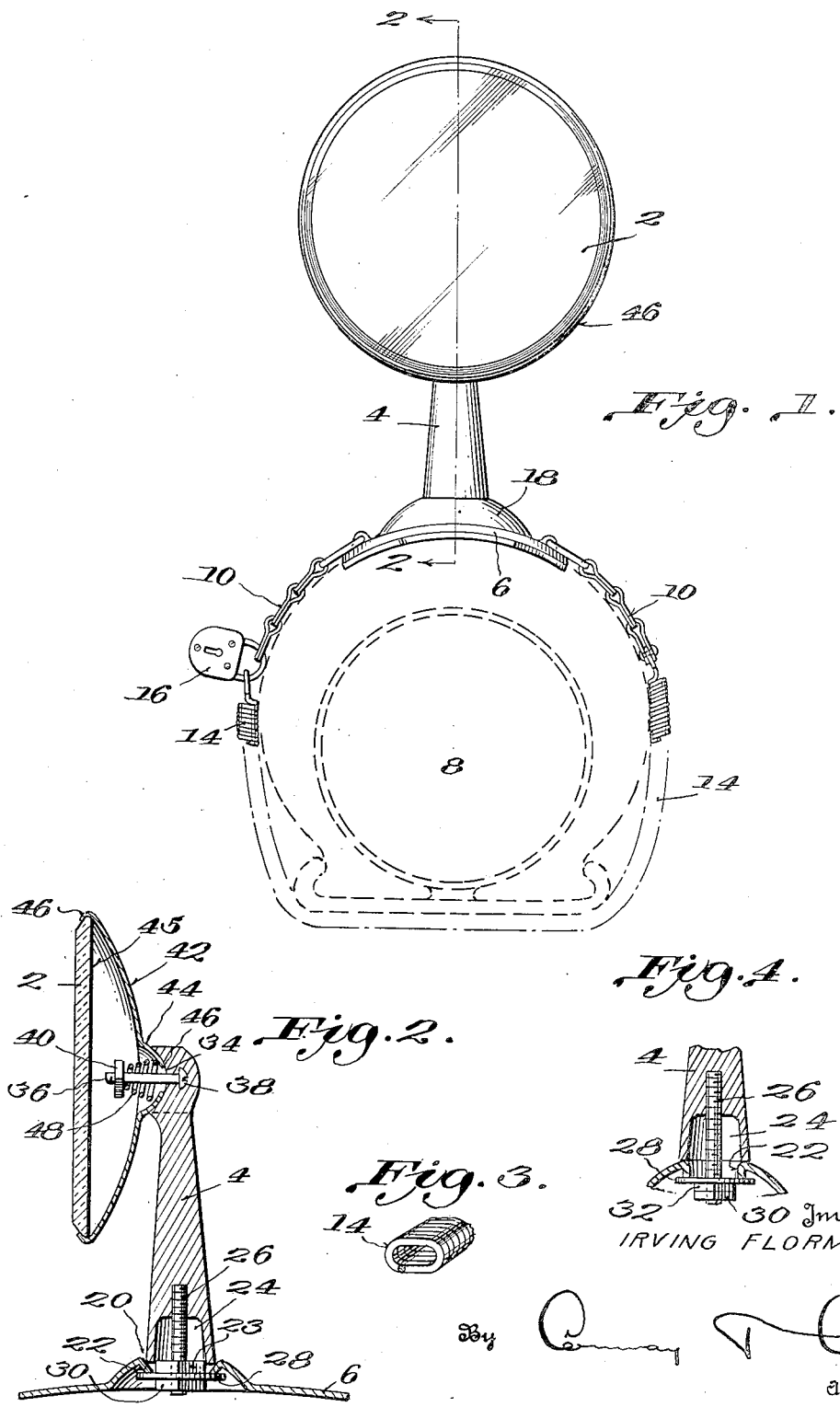

1,796,093

UNITED STATES PATENT OFFICE

IRVING FLORMAN, OF NEW YORK, N. Y.

REAR-VIEW MIRROR FOR AUTOMOBILES

Application filed April 15, 1930. Serial No. 444,537.

This invention relates to a rear view mirror for automobiles and more particularly to such a mirror which is adapted to be carried on a spare tire on the side of a car.

Many cars at this time have on one or both sides front fenders which have a so-called well therein in which a spare tire may be carried. The practice has arisen of mounting a rear view mirror on the left hand spare tire since this gives a better view of the road behind than the usual inside mirror. These mirrors as constructed heretofore have had a number of disadvantges. In the first place, they are likely to slip on the tire and so to fall out of the proper line of vision. Secondly, there has been considerable difficulty in getting a mirror which could be set quickly and easily to any desired angle and which would remain set at that angle.

The object of the present invention is to avoid the above named difficulties. More specifically, one object of the invention is to provide a resilient member for encircling the tire so as to hold the mirror bracket securely in place. A second object is to provide a connection between the mirror and its bracket such that the mirror may be quickly adjusted to any desired angle and will be retained at that angle in spite of the shocks to which it is subjected. A further object of the invention is to provide a mirror frictionally held in adjusted position by a spring with simple means for adjusting the tension of the spring. Still another object is the new and advantageous method of mounting the bolts in the mirror bracket.

Other objects and advantages of the invention will appear from the following description taken in connection with the accompanying drawing which forms a part thereof.

In the drawing:

Fig. 1 is a front elevation of the mirror mounted on a tire.

Fig. 2 is a cross section on the line 2—2 of Fig. 1.

Fig. 3 is a cross section of the spring.

Fig. 4 is a detail cross section of a modified form of the attachment of the bracket to the base.

The invention in general comprises a mirror 2 mounted on a bracket 4 which in turn is carried by a plate 6 fitted on the tire 8. The plate 6 is curved to fit the contour of the tire as shown. To either side of the plate are secured short chain members 10. To one of these chain members as at 12 is secured a long coil spring 14, preferably flattened in cross section, as shown in Fig. 3, which extends beneath the tire and is secured by a catch or padlock at 16 to the end of the other chain 10. The plate 6 is thus held resiliently in place on the tire. This prevents slipping of the mirror which is often caused by the jolts to which such a device is subjected. The use of a padlock at 16 also serves to prevent theft of the mirror.

In the center of the plate 6 is an upward protuberance 18. This is substantially spherical in form. In the center of this protuberance is an aperture 20 surrounded by a downwardly extending sloping flange 22. The bracket 4 has in its lower portion a depression 24 from which extends the bolt 26, the end of which is cast into the bracket 4. The lower end of this bolt is screw threaded. Over this bolt fits a washer 28 which rests at its edges upon the flange 22. A nut 23 is provided above this washer to steady it on the bolt. A nut 30 presses the washer tightly against the flange to secure the bracket to the plate, the edge of the bottom of the bracket resting on the sloping flange 22 which prevents the passage of the bracket through the opening. If desired a lock washer may be inserted between the nut and the washer 28. The depth of the portion 18 is such that the bolt 26 does not extend below the general plane of the plate 6 and so does not strike the tire.

The upper part of the bracket 4 is provided with a spherical seat or socket 34. Extending outwardly through the center of this socket is a bolt 36, the head 38 of which is cast into the metal of the bracket 4. The end of this bolt is screw threaded and carries a nut 40. The mirror frame 42 has a spherical central projection 44 which fits in the socket 34. In the center of this projection is an aperture 46 of considerable size which fits over the bolt 36 but which has a diameter considerably greater than the diameter of the said bolt. A coil spring 48 rests against the inner side of the projection 44 and against the nut 40. This spring is made in the form of a cone so that it will rest upon the sides of the aperture 44 while permitting the use of a small nut at 40. The friction between the spring and the spherical projection and nut permits adjustment of the nut and thus of the tightness of the spring by rotation of the mirror frame 42. The tightness of the spring may thus be adjusted without disassembling any parts and yet the device has no protruding portions which would mar its appearanec. The construction described permits universal movement between the bracket 4 and the mirror 2 and the friction between the parts serves to hold the mirror in any position to which it may be adjusted.

The mirror is held in the frame 42 by turning in the edges of the frame as at 46. The mirror may be flat or curved as desired. The mirror frame, however, is preferably spherical, so as to leave a space behind the mirror for the bolt 36 and nut 40. A backing of plain or corrugated resilient material 45 is preferably provided between the mirror and the frame 42, and serves to protect the mirror against breaking.

A modified form of the connection between the bracket and the plate is shown in Fig. 4. The flange 22 in this figure is vertical rather than sloping. The edges of the bottom of the bracket rest on the top of the protuberance outside of the aperture 20. A spring lock washer 32 is provided between the nut 30 and the washer 28.

Although I have described one embodiment of my invention, I wish it to be understood that I do not intend to limit myself thereby except within the scope of the appended claim.

I claim:

A rear view mirror comprising a support having a spherical socket therein, a bolt extending outwardly through the center of said socket, a mirror frame having a spherical projection, said spherical projection having an aperture therein of greater diameter than said bolt and fitting over said bolt, a nut on the end of said bolt, and a conical coil spring having its larger end engaging directly the inside of said spherical projection and its smaller end engaging said nut, whereby to hold said frame in place on said support in adjustable relation thereto, the friction between said spring and said spherical projection and nut being such that rotation of said frame turns said nut to adjust the tension of said spring.

In testimony whereof, I have hereunto set my signature.

IRVING FLORMAN.